United States Patent Office 3,364,210
Patented Jan. 16, 1968

3,364,210
SUBSTITUTED 3-AMINOACRYLOPHENONES AND METHOD OF PREPARING THE SAME
Sidney Robert Safir, River Edge, N.J., and Richard P. Williams, Tomkins Cove, N.Y., assignors to American Cyanamid Company, Stamford, Conn., a corporation of Maine
No Drawing. Filed Oct. 5, 1964, Ser. No. 401,699
13 Claims. (Cl. 260—240)

ABSTRACT OF THE DISCLOSURE

The novel compounds belonging to the class 3',4',5'-trimethoxy-3-aminoacrylophenones are described. These compounds are useful for their activity as central nervous system depressants.

---

The novel rompounds of the present invention are desrribed as 3',4',5'-trimethoxy-3-aminoacrylophenones and may be represented by the formula:

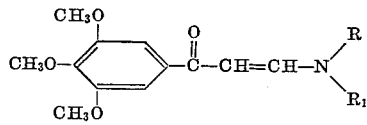

wherein R and $R_1$ are selected from the group consisting of lower alkyl, lower alkenyl and cycloalkyl and the grouping

is selected from the group consisting of pyrrolidino, $\Delta^3$-pyrrolino, piperidino, morpholino and hexamethyleneimino.

The compounds of the present invention are, in general, low-melting crystalline solids, sparsely soluble in water, but soluble in lower alkanols, benzene, toluene, acetone and the like.

The compounds of this invention may be prepared conveniently by either of two methods. The first method consists of the reaction of 3,4,5-trimethoxybenzaldehyde with acetylene to form α-ethynyl-3,4,5-trimethoxybenzyl alcohol; oxidation of this intermediate alcohol to the corresponding 3',4',5'-trimethoxypropiolophenone; and reaction of this intermediate propiolophenone with an appropriate secondary amine to form the desired product. The above reaction may be illustrated as follows:

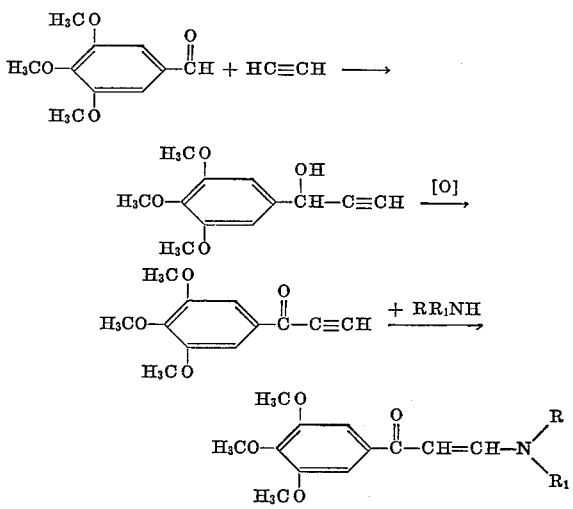

wherein R, $R_1$ and

are as hereinbefore described.

The first reaction may conveniently be carried out in the presence of an alkali metal, such as, for example, sodium in an appropriate solvent such as liquid ammonia. The reaction is usually carried out at the reflux temperature of the solvent (about —30° C. when liquid ammonia is used). After acidification of the final reaction mixture, the 2-ethynyl-3,4,5-trimethoxybenzyl alcohol is isolated and then reacted with an oxidizing agent, such as, for example, chromic anhydride to yield 3',4',5'-trimethoxypropiolophenone.

The oxidation is ordinarily carried out in an aqueous acid solvent such as, for example, a dilute aqueous mineral acid at a temperature ranging from about —10° C. to +10° C. The 3',4',5'-trimethoxypropiolophenone may then be reacted with a secondary amine such as dimethylamine, diethylamine, dipropylamine, dibutylamine, ethylmethylamine, or the like; a secondary alkenylamine such as diallylamine; a secondary cycloalkylamine such as methylcyclohexylamine; or a secondary heterocyclic amine such as $\Delta^3$-pyrroline, pyrrolidine, piperidine, morpholine, hexamethyleneimine, or the like. This latter reaction is ordinarily carried out at a temperature ranging from about 0° C. to about 80° C. in a solvent such as methanol, diethyl ether, benzene, toluene, or the like.

Alternately 3',4',5'-trimethoxyacetophenone may be reacted with ethyl formate using a condensing agent such as sodium hydride, sodium ethoxide, or sodium metal in a nonpolar solvent such as, for example, ether, to give the sodium salt of β-(3,4,5-trimethoxybenzoyl)vinyl alcohol. The latter product may then be reacted with an appropriate amine salt, e.g., dimethylamine hydrochloride, diethylamine hydrochloride, diallylamine sulfate, or $\Delta^3$-pyrroline sulfate, in aqueous solution to give the corresponding 3',4',5'-trimethoxy-3-aminoacrylophenone derivative. This series of reactions may be illustrated as follows:

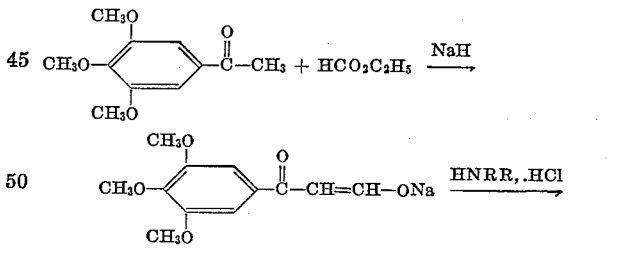

wherein R, $R_1$ and

are as defined above.

The compounds of this invention are active central nervous system depressants, useful as medicaments. The compounds may be used, for example, as sedatives, hypnotics, tranquilizers, and muscle relaxants. The compounds may be dispensed in the usual pharmaceutical forms well known in the compounding arts such as tablets, capsules, and the like.

The following examples describe in detail the preparation of representative substituted aminoacrylophenones of the present invention.

EXAMPLE 1

*Preparation of α-ethynyl-3,4,5-trimethoxybenzyl alcohol*

In a 2-liter 3-necked flask equipped with a Dry Ice-acetone reflux condenser and bath, stirrer, dropping funnel and gas inlet tube is collected 1 liter of liquid ammonia. Then acetylene, purified by passing through concentrated sulfuric acid and soda lime is bubbled through the stirred ammonia for a few minutes. Sodium metal (11.5 g., 0.5 g. atom) cut into small pieces is added portionwise at such a rate that the transient blue color formed lasted for only a second while continuing to stir and bubble in acetylene. After the addition is completed (about 15 minutes) the cloudy solution is stirred for an additional 15 minutes. Then 98.1 g. (0.5 mole) of finely powdered 3,4,5-trimethoxybenzaldehyde and 400 ml. of ether are added portionwise as a slurry during 30 minutes with rapid stirring and addition of acetylene to the reaction mixture which slowly changes from colorless to dark brown during the addition. Then the reaction is stirred for an additional three hours after which the ammonia is allowed to evaporate.

The brown gummy residue from the reaction is acidified with 2 N sulfuric acid after adding an additional 400 ml. of ether and chilling. The aqueous solution (pH 2) is separated from the ether and re-extracted twice. The combined ether extracts are washed with saturated sodium bisulfite, sodium bicarbonate and finally sodium chloride solutions before drying with anhydrous magnesium sulfate. After removing the solvent, 93 g. (84%) of crude orange oily α-ethynyl-3,4,5-trimethoxybenzyl alcohol is obtained. A small sample of the crude oil is purified for analysis by evaporative distillation in a creased tube at 110°/0.005 mm. to give a colorless oil which crystallized on standing to needles which are recrystallized from ether-petroleum ether and then sublimed under reduced pressure to obtain material of analytical purity.

EXAMPLE 2

*Preparation of 3',4',5'-trimethoxypropiolophenone*

To a chilled solution under nitrogen of 83 g. (0.37 mole) of crude undistilled α-ethynyl - 3,4,5 - trimethoxybenzyl alcohol in 540 ml. of acetone is added dropwise under nitrogen during 50 minutes, a chilled (0–5° C.) solution of 32.7 g. of chromic anhydride in 92 ml. of water and 27 ml. of concentrated sulfuric acid with efficient stirring. The reaction mixture first turns purple and then becomes dark green and a heavy precipitate forms. After the addition period the reaction is allowed to warm to room temperature and stirred for 30 minutes. Then 2.5 liters of water is added slowly with stirring and after chilling the crude crystals are removed, washed with water and dried under reduced pressure to give 48.5 g. (59%) of yellow crystals, melting point 122°–128° C. of 3',4',5'-trimethoxypropiolophenone.

EXAMPLE 3

*Preparation of 3',4',5'-trimethoxy-3-morpholino-acrylophenone*

A solution of 3',4',5' - trimethoxypropiolophenone is prepared by dissolving 3.30 g. (0.015 mole) in 200 ml. of ether using mechanical stirring. When most of the solid has dissolved the solution is clarified by filtration. To the chilled clear yellow filtrate is added in one portion a solution of 1.30 ml. (1.30 g., 0.015 mole) of morpholine in 100 ml. of ether with stirring. After 15 hours the reaction mixture is evaporated to dryness under reduced pressure. The crude residue is crystallized from benzene-cyclohexane to give 3.2 g. (70%) of 3',4',5'-trimethoxy - 3 - morpholinoacrylophenone as brown crystals, melting point 146°–147° C. A small sample of the crystals is recrystallized repeatedly from benzene to give cream colored crystals melting point 149°–150° C.

EXAMPLES 4–13

The following compounds are prepared by reacting 3',4',5' - trimethoxypropiolophenone with an amine ($HNRR_1$) as described in Example 3.

| Example No. | R | $R_1$ | Melting Point, °C. |
|---|---|---|---|
| 4 | $CH_3-$ | $CH_2-$ | 125–127 |
| 5 | $CH_3-$ | $C_2H_5-$ | 103–104 |
| 6 | $CH_3-$ | ⟨H⟩– | 98–99 |
| 7 | $C_2H_5-$ | $C_2H_5-$ | 105–105.5 |
| 8 | $CH_3CH_2CH_2-$ | $CH_3CH_2CH_2-$ | 64–65 |
| 9 | $CH_3(CH_2)_2CH_2-$ | $CH_3(CH_2)_2CH_2-$ | 65–65.5 |
| 10 | $CH_2=CHCH_2-$ | $CH_2=CHCH_2-$ | 80–81 |
| 11 | $NRR_1=$ ⟩N– | | 134–135 |
| 12 | $NRR_1=$ ⟩N– | | 119–120 |
| 13 | $NRR_1=$ ⟩N– | | 101–102 |

EXAMPLE 14

*Preparation of the sodium salt of β-(3,4,5-trimethoxy-benzoyl)vinyl alcohol*

In a 2-liter 3-necked flask equipped with reflux condenser, stirrer, gas inlet tube, dropping funnel and heating mantle, after purging with nitrogen is placed 11 g. of sodium hydride (55% in oil) and 120 ml. of anhydrous ethyl ether followed by a solution of 39 ml. of ethyl formate in 120 ml. of ether during 10 minutes. After adding 0.5 ml. of ethanol to initiate the reaction, a solution of 50.4 g. of 3,4,5-trimethoxyacetophenone in 1500 ml. of ether is added during 30 minutes and the reaction refluxed for 2.5 hours. The excess sodium hydride is decomposed by adding 100 ml. of ethanol and the precipitate removed by filtration and dried to give 72 g. of the sodium salt of β-(3,4,5-trimethoxybenzoyl)vinyl alcohol, melting point 170° C.

EXAMPLE 15

*Preparation of 3-(diallylamino)-3',4',5'-trimethoxy-acrylophenone*

To a solution of 4.0 g. of the sodium salt of β-(3,4,5-trimethoxybenzoyl)vinyl alcohol in 40 ml. of water is added a solution of 3.1 g. of diallylamine in dilute sulfuric acid (4 ml. of 4 N acid in 24 ml. of water). After standing for several days 3.1 g. of crude crystals separate. Recrystallization from cyclohexane gives 2.5 g. of 3-(diallylamino)-3',4',5'-trimethoxyacrylophenone in the form of pale yellow needles, melting point 81°–82° C.

EXAMPLES 16–18

The following compounds are prepared by reacting the sodium salt of β-(3,4,5-trimethoxybenzoyl)vinyl alcohol with an amine ($HNRR_1$) as described in Example 15.

| Example No. | $NRR_1$ | Melting Point, °C. |
|---|---|---|
| 16 | ⟩N– | 132–132.5 |
| 17 | ⟩N– | 119–120 |
| 18 | ⟩N– | 134–135 |

We claim:
1. A compound of the formula:

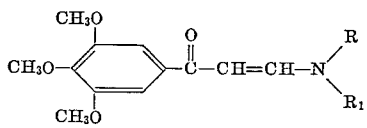

wherein R and R₁ are selected from the group consisting of lower alkyl, lower alkenyl and cycloalkyl and the grouping

is selected from the group consisting of pyrrolidino, Δ³-pyrrolino, piperidino, morpholino and hexamethyleneimino.

2. The compound 3-(Δ³-pyrrolino)-3',4',5'-trimethoxyacrylophenone.
3. The compound 3-(dimethylamino)-3',4',5'-trimethoxyacrylophenone.
4. The compound 3-(ethylmethylamino)-3',4',5' - trimethoxyacrylophenone.
5. The compound 3-(methylcyclohexylamino)-3',4',5'-trimethoxyacrylophenone.
6. The compound 3-(dipropylamino)-3',4',5'-trimethoxyacrylophenone.
7. The compound 3-(dibutylamino)-3',4',5' - trimethoxyacrylophenone.
8. The compound 3-(diallylamino)-3',4',5' - trimethoxyacrylophenone.
9. The compound 3-piperidino - 3',4',5' - trimethoxyacrylophenone.
10. The compound 3-morpholino-3',4',5' - trimethoxyacrylophenone.
11. The compound 3-pyrrolidino-3',4',5' - trimethoxyacrylophenone.
12. The compound 3-(diethylamino)-3',4',5' - trimethoxyacrylophenone.
13. The compound 3 - (hexamethyleneimino)-3',4',5'-trimethoxyacrylophenone.

References Cited
UNITED STATES PATENTS
3,268,407   8/1966   Hofmann _____ 167—65

OTHER REFERENCES

Chemical Abstracts, vol. 49, col. 3185 (1955) (abstracts of Hirao).

Hager, J. Am. Pharm. Assoc., vol. 44, pp. 138–141 (1955).

JOHN D. RANDOLPH, *Primary Examiner.*